Patented Aug. 3, 1948

2,446,421

UNITED STATES PATENT OFFICE 2,446,421

MANUFACTURE OF ARYLBIGUANIDE HYDROCHLORIDES

Barbara Rosamund Jacobs, London, and Zvi Enrico Jolles, Manchester, England, assignors to Imperial Chemical Industries Limited, a corporation of Great Britain No Drawing. Application November 15, 1945, Serial No. 628,979. In Great Britain November 3, 1944

4 Claims. (Cl. 260—565)

The present invention relates to the manufacture of biguanyl compounds; more particularly it relates to the manufacture of arylbiguanyl compounds devoid of sulphonic acid groups.

It has already been proposed to make arylbiguanyl compounds, e. g. m-biguanylnitrobenzene, by interaction in aqueous medium, or in an organic solvent such as alcohol of dicyandiamide with the required arylamine. In the case of m-biguanylnitrobenzene the requisite arylamine would be m-nitroaniline. In the case of such a reaction, it is necessary, however, that there be acid present to act as a catalyst. The acid may be directly added to the mixture of reactants and reaction medium or, optionally, introduced in the form of a salt of the arylamine. It is also known that arylbiguanyl compounds may be obtained by effecting the aforesaid reaction in the presence of an inorganic salt, for instance, copper sulphate; in this case the arylbiguanyl compound is obtained in the form of its complex with the metal salt, from which it has subsequently to be liberated by, for example, precipitating the metal in aqueous solution with sodium sulphide. We have now found that the interaction between the arylamine and the dicyandiamide is more advantageously to be brought about in the reaction medium which is a tertiary amine. By this means the product desired, namely the arylbiguanyl compound, is obtained directly (and does not need liberating from a metallic complex) and moreover the reaction runs smoothly with good resultant yield.

Accordingly, the present invention relates to a new process for the manufacture of arylbiguanyl compounds comprising heating an aromatic amine of the benzene or naphthalene series, which is devoid of sulphonic acid groups, together with dicyandiamide in the presence of a mineral acid, in a reaction medium, which is a tertiary amine substantially free from water.

The products of the process of the present invention, which are arylbiguanyl compounds, are useful as intermediates, for example, in the dyestuffs industry.

By way of an arylamine there may be used, for example, in accordance with the present invention, m-nitroaniline, aniline, m- or p-phenylenediamine or benzidine. The arylamine employed may contain, apart from nitro groups, other substituents, for example: alkoxy, alkyl, halogen, hydroxy or acylamino groups.

The mineral acid to be employed may be, for example, hydrogen chloride or hydrobromic acid and is conveniently introduced in the form of a salt either of the arylamine or of the tertiary amine. Alternatively the acid may be introduced separately from the arylamine and the tertiary amine, provided it is in substantially anhydrous form, e. g. gaseous hydrochloride.

In working according to the invention it is preferred to use for every molecular proportion of arylamine at least one molecular proportion of dicyandiamide and at least one molecular proportion of mineral acid.

Various tertiary amines may be employed as reaction media in the present invention, examples of which are: pyridine and dimethylaniline. As indicated above, it is essential that the tertiary amine used be substantially anhydrous.

The temperature used for the purpose of effecting the reaction between the arylamine and the dicyandiamide may be, for example, 100–135° C., but an excessive temperature is to be avoided because it tends to decompose the reactants. Thus it may usually be desirable to avoid a temperature much exceeding 150° C.

The following examples in which the parts are by weight are intended to illustrate but not limit the invention.

Example 1

6.9 parts of m-nitroaniline, 4.6 parts of dicyandiamide and 7.8 parts of dimethylaniline hydrochloride are heated at 135° C. for 3½ hours in 75 parts of dimethylaniline. After about one hour a precipitate begins to form, gradually increasing in bulk. This precipitate, which is the product of the reaction, is m-biguanylnitrobenzene hydrochloride. It is conveniently purified by recrystallisation from water, after which it appears as a whitish substance melting at 226–228° C.

Example 2

4.6 parts of aniline, 4.7 parts of dicyandiamide and 6.2 parts of pyridine hydrochloride are heated under reflux for 3½ hours in 50 parts of pyridine. A white crystalline solid separates from the solution. This solid is biguanylbenzene hydrochloride.

Example 3

4.7 parts of aniline, 8.4 parts of dicyandiamide, 9.2 parts of triethanolamine hydrochloride and 50 parts of dimethylaniline are heated at 120° C. for 2 hours. The same product is obtained as in Example 2.

Example 4

2.5 parts of aniline hydrochloride, 1.84 parts of dicyandiamide and 50 parts of pyridine are boiled together under reflux for 2 hours. The product separates as a white crystalline precipitate which is biguanylbenzene hydrochloride.

*Example 5*

5.4 parts of m-phenylenediamine, 9.4 parts of dicyandiamide, 11.4 parts of pyridine hydrochloride and 75 parts of pyridine are boiled together under reflux during 5 hours. The product separates as a brownish solid which is boiled with ethanol and so obtained in the form of a greyish powder which consists of m-bis-biguanylbenzene dihydrochloride.

If p-phenylenediamine is used in place of m-phenylenediamine in the above example, p-bis-biguanylbenzene dihydrochloride is obtained.

*Example 6*

9.2 parts of benzidine, 9.4 parts of dicyandiamide, 11.6 parts of pyridine hydrochloride and 100 parts of pyridine are heated together at the boil and stirred under reflux during 4 hours. The product which separates as a greyish powder is 4:4'-bis-biguanylbenzidine dihydrochloride.

We claim:

1. The process of manufacturing an arylbiguanide hydrochloride which comprises heating at a temperature of 100° to 150° C. a substantially anhydrous mixture composed essentially of a primary arylamine of the group consisting of aniline, meta-nitroaniline, meta-phenylenediamine, para-phenylenediamine and benzidine together with dicyandiamide, a solvent and hydrogen chloride, until the arylbiguanide hydrochloride corresponding to said arylamine is formed; said solvent being one of the group consisting of pyridine and dimethylaniline; and said hydrogen chloride being present in the form of the hydrochloride of an amine of the group consisting of pyridine, dimethylaniline, triethanolamine and said primary arylamines.

2. The process in accordance with claim 1 in which the amine hydrochloride is pyridine hydrochloride.

3. The process in accordance with claim 1 in which the amine hydrochloride is dimethylaniline hydrochloride.

4. The process in accordance with claim 1 in which the amine hydrochloride is triethanolamine hydrochloride.

BARBARA ROSAMUND JACOBS.
ZVI ENRICO JOLLES.

REFERENCES CITED

The following references are of record in the file of this patent:

UNITED STATES PATENTS

| Number | Name | Date |
|---|---|---|
| 1,795,738 | Schotte | Mar. 10, 1931 |
| 1,822,065 | Spongerts et al. | Sept. 8, 1931 |
| 2,195,073 | Beretta | Mar. 26, 1940 |
| 2,221,333 | Sibley | Nov. 12, 1940 |
| 2,255,090 | Tinker et al. | Sept. 9, 1941 |
| 2,304,821 | Hansen et al. | Dec. 15, 1942 |

FOREIGN PATENTS

| Number | Country | Date |
|---|---|---|
| 255,466 | Great Britain | Dec. 9, 1926 |
| 304,360 | Great Britain | Jan. 21, 1929 |
| 307,906 | Great Britain | Feb. 20, 1930 |
| 348,661 | Great Britain | May 12, 1931 |
| 491,163 | Great Britain | Aug. 29, 1938 |
| 546,027 | Great Britain | June 24, 1942 |
| 551,445 | Great Britain | Feb. 23, 1943 |
| 481,925 | Germany | Sept. 2, 1929 |
| 530,398 | Germany | July 29, 1931 |
| 27,166 | Netherlands | May 18, 1932 |

OTHER REFERENCES

Sidgwick's Org. Chemistry of Nitrogen (Taylor & Baker 1937) p. 522.